United States Patent [19]

Friedrich et al.

[11] Patent Number: 5,725,920
[45] Date of Patent: Mar. 10, 1998

[54] FIBER-REINFORCED RESIN PIPE HAVING IMPROVED IMPACT RESISTANCE

[75] Inventors: Ralph S. Friedrich, Hermosa Beach, Calif.; Duane G. Hemphill, Burkburnett, Tex.; Joie L. Folkers; Brian M. Francis, both of Wichita Falls, Tex.; Gordon G. Robertson, Houston, Tex.

[73] Assignee: Ameron International Corporation, Pasadena, Calif.

[21] Appl. No.: 642,219

[22] Filed: May 6, 1996

[51] Int. Cl.$^6$ .................... A47G 19/22; B28B 21/00
[52] U.S. Cl. .................. 428/34.7; 428/363; 428/36.91
[58] Field of Search .................... 428/34.7, 36.3, 428/36.91

[56] References Cited

U.S. PATENT DOCUMENTS

| | | | |
|---|---|---|---|
| 3,706,615 | 12/1972 | Nishiyama et al. | 156/169 |
| 3,874,972 | 4/1975 | Wesgh | 156/169 |
| 3,992,237 | 11/1976 | Gerholt et al. | 156/86 |
| 4,053,447 | 10/1977 | Shea | 260/38 |
| 4,076,873 | 2/1978 | Shea | 428/35 |
| 4,080,999 | 3/1978 | Bulters et al. | 138/125 |
| 4,107,127 | 8/1978 | Shea | 260/38 |
| 4,214,932 | 7/1980 | Van Auken | 156/187 |
| 4,892,764 | 1/1990 | Drain et al. | 428/34.5 |
| 5,071,687 | 12/1991 | Shigetoh | 428/35.9 |
| 5,091,230 | 2/1992 | Fuchs et al. | 428/36.4 |
| 5,383,994 | 1/1995 | Shea | 156/175 |

*Primary Examiner*—Helen Lee
*Attorney, Agent, or Firm*—Christie, Parker & Hale, LLP

[57] ABSTRACT

Fiber-reinforced resin pipes and pipe fittings have a structural pipe wall formed from helically wound reinforcing fiber that is bonded together with a polymer resin. An intermediate layer is disposed around the structural pipe wall, and a fiber-reinforced layer is disposed around the intermediate layer. The intermediate layer is formed from material selected from the group consisting of impact attenuating and impact absorbing materials. The fiber-reinforced resin layer comprises layers of helically wound reinforcing fiber bonded together with a polymer resin. The materials selected to form the fiber-reinforced resin layer can be the same or different from that used to form the structural pipe wall. The pipe may comprise a single intermediate and fiber-reinforced layer disposed around the structural pipe wall, or may comprise an impact resistant jacket disposed around the structural pipe wall, wherein the jacket is made up of alternating intermediate and fiber-reinforced resin layers. Fiber-reinforced resin pipes, constructed according to principles of this invention, have improved impact resistance when compared to conventionally constructed fiber-reinforced resin pipes.

13 Claims, 2 Drawing Sheets

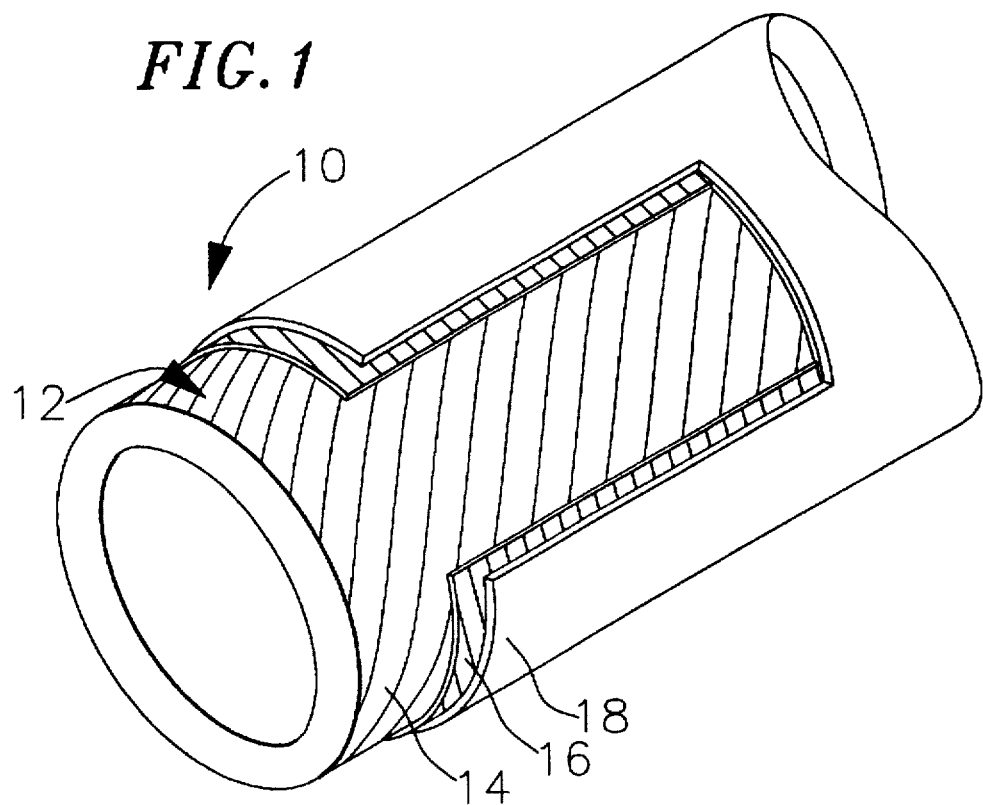
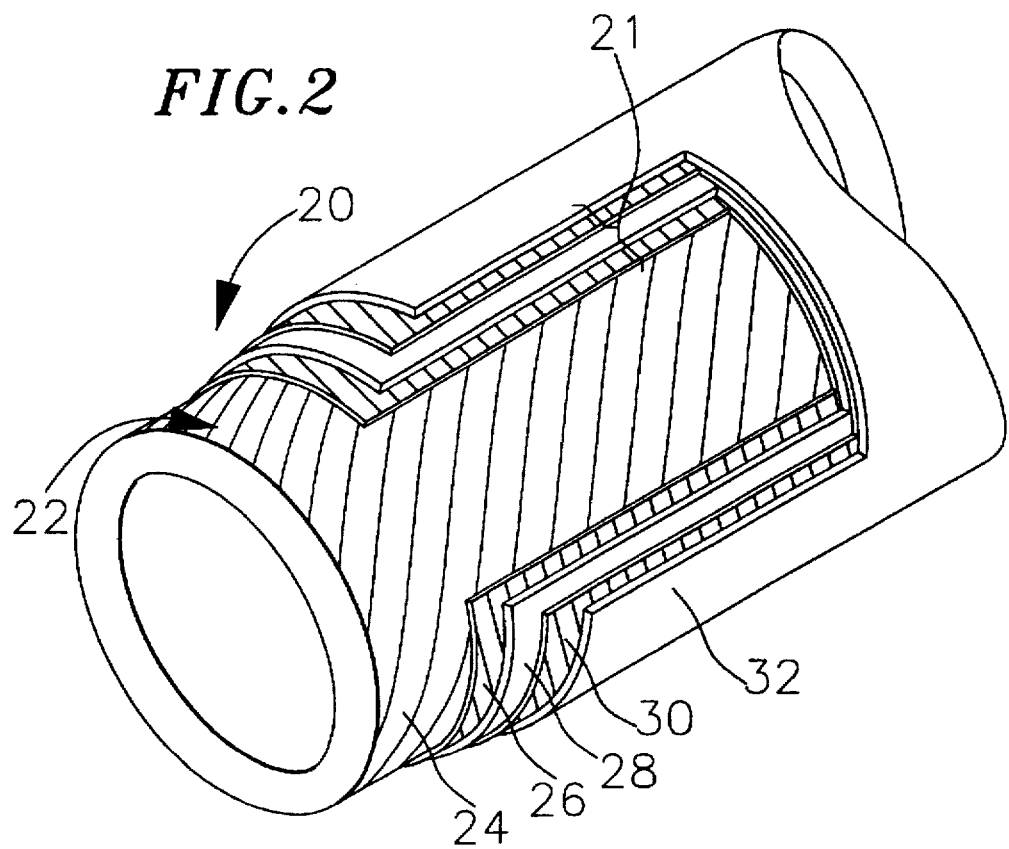

5,725,920

FIBER-REINFORCED RESIN PIPE HAVING IMPROVED IMPACT RESISTANCE

FIELD OF THE INVENTION

The present invention relates generally to fiber-reinforced resin pipes and pipe fittings and, more particularly, to a filament wound fiber-reinforced pipe and pipe fitting construction having improved impact resistance.

BACKGROUND OF THE INVENTION

Pipes and pipe fittings formed from fiber-reinforced plastics have gained widespread acceptance as viable alternatives to their steel counterparts in such applications where cost, weight, and/or chemical resistance is a concern. Conventional fiber-reinforced plastic pipes include a filament component that is wound on a mandrel, and a resin component that is used to bond the filament windings together. The filament winding acts to structurally reinforce the otherwise resin pipe by providing a desired degree of hoop and longitudinal strength to the pipe.

The fiber and resin components are selected for one or more desired physical properties, making the pipe particularly adapted to a specific application. Resins useful for forming fiber-reinforced pipes include polyester, vinyl ester, phenolic, and epoxy resins, as these resins are typically favored because of their good weatherability, corrosion, chemical resistance, and heat resistance. However, these resins are also known to be brittle after cure, which ultimately reduces the impact strength of fiber-reinforced pipes that are formed from such resins.

Fiber-reinforced plastic pipes and pipe fittings are commonly used in applications where the pipe is either buried underground, where the pipe is subject to impact forces during backfilling, or above the ground, where the outside surface of the pipe can be subjected to impact forces by a variety of movable objects. Conventionally constructed fiber-reinforced plastic pipes, formed from the above-described resins, are known to have a lessor degree of impact resistance than metal pipes and, therefore, are more prone to be damaged by impact forces acting on the outside pipe surface.

An impact force to the outside wall of a fiber-reinforced pipe travels in the form of a shock wave through the multiple fiber-reinforced resin layers, which may cause the layers to fracture or separate. Depending on the magnitude of the impact force, the impact shock wave can travel completely through the fiber-reinforced resin layers and to the inside pipe wall, which can cause the inside pipe wall to leak or rupture and spill the contents of the pipe to the surrounding environment.

It is, therefore, desired that a fiber-reinforced plastic pipe be constructed that has an improved degree of impact resistance as compared to conventionally constructed fiber-reinforced plastic pipe. It is desired that the pipe construction not detract from the already known advantages of fiber-reinforced plastic pipe when compared to metal pipe, such as corrosion resistance, weight savings, chemical resistance, weather resistance and the like.

SUMMARY OF THE INVENTION

There is, therefore, provided in the practice of this invention fiber-reinforced resin pipes and pipe fittings that are constructed having improved impact resistance compared to conventionally constructed fiber-reinforced resin pipes. Fiber-resistant pipes, prepared according to principles of this invention, include a structural pipe wall formed from helically wound reinforcing fiber that is bonded together with a polymer resin. The polymer resin is selected from the group including polyester resins, vinyl ester resins, epoxy resins and the like. The helically wound reinforcing fiber is wetted by the resin so that it comprises in the range of from about 10 to 40 percent by weight resin. The structural wall is formed from multiple layers of the windings, wherein the number of layers depend on such factors as the desired hoop strength and longitudinal strength that is desired for a particular pipe application.

An intermediate layer is disposed around the structural pipe wall, and a fiber-reinforced layer is disposed around the intermediate layer. The intermediate layer is formed from material selected from the group consisting of impact attenuating and impact absorbing materials. Impact attenuating materials useful for forming the intermediate layer include substantially incompressible materials that are chemically incompatible with, and unable to form a bond with, the resins that are used to form the structural pipe wall and fiber-reinforced resin layer. Impact absorbing materials useful for forming the intermediate layer include compressible and crushable materials that may or may not be chemically incompatible with the resins used to form the structural wall and fiber-reinforced resin layers.

The fiber-reinforced resin layer comprises layers of helically wound reinforcing fiber bonded with a resin selected from the group including polyester resins, vinyl ester resins, epoxy resins, and mixtures thereof. The materials selected to form the fiber-reinforced resin layer can be the same or different from that used to form the structural pipe wall.

The pipe may comprise a single intermediate and fiber-reinforced layer disposed around the structural pipe wall, or may comprise an impact resistant jacket disposed around the structural pipe wall, wherein the jacket is made up of alternating intermediate and fiber-reinforced resin layers.

Fiber-reinforced pipes, constructed according to principles of this invention, have been shown to provides an improvement in impact resistance of on the order of 300 percent, when compared to conventionally constructed fiber-reinforced resin pipes, thereby minimizing the possibility of impact related pipe failure.

BRIEF DESCRIPTION OF THE DRAWINGS

These and other features and advantages of the present invention will become appreciated as the same becomes better understood with reference to the specification, claims, and drawings wherein:

FIG. 1 is a perspective view of a first exemplary embodiment of a fiber-reinforced resin pipe constructed according to principles of this invention;

FIG. 2 is a perspective view of a second exemplary embodiment of a fiber-reinforced resin pipe constructed according to principles of this invention.

DETAILED DESCRIPTION

Figure 3A:
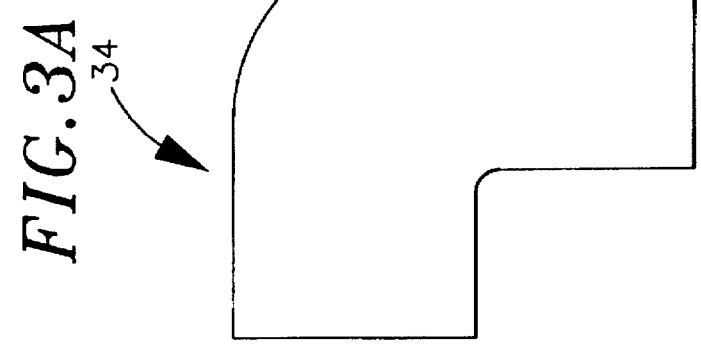
FIGS. 3A to 3C are elevational side views of pipe fittings constructed according to principles of this invention.

Referring to FIG. 1, an exemplary fiber-reinforced resin pipe 10, constructed according to principles of this invention, includes a structural pipe wall 12 formed from multiple layers of helically wound reinforcing fiber 14 bonded together with a resin. The structural pipe wall 12 can be formed by using conventional techniques well known in the art for forming fiber-reinforced plastic (FRP) pipe, such as by winding the reinforcing fiber around a mandrel at one or more specific wind angles, and in one or more directions, to obtain a particular degree of hoop and longitudinal strength. In a preferred embodiment, the fiber windings are wound under tension at an angle of approximately 54 degrees around the mandrel in one direction and then in an opposite direction, as this wind angle produces a pipe having an optimum degree of both hoop and longitudinal strength. The number of fiber windings that are used to construct the structural pipe wall depends on the particular size of and application for the pipe. While the above-described technique has been directed toward the construction of pipe, it is to be understood that the same technique can be used to construct pipe fittings such as tees, elbows and the like as well.

The reinforcing fiber component may be selected from conventional filament materials used for forming fiber-reinforced pipe such as glass, carbon, Kevlar and the like, and combinations thereof. In a preferred embodiment, the reinforcing fiber is glass. The structural pipe wall is constructed so that a sufficient amount of the resin component is used to wet and bond together the fiber windings. The structural pipe wall may comprise in the range of from about 10 to 40 percent by weight of the resin component. In a preferred embodiment, the structural pipe wall comprises approximately 25 percent by weight resin. The resin is applied to the fiber windings by a conventional application technique, such as by running the windings through a resin bath.

The resin component may be selected from the group of resins that include polyester resins, vinyl ester resins, epoxy resins, that may or may not include siloxane modification, and the like. The fiber-reinforced pipe construction of this invention is particularly suited to improve the impact resistance of pipes that are formed from resin systems that are known to become brittle upon cure.

Referring again to FIG. 1, the fiber-reinforced pipe 10 includes an intermediate layer 16 disposed onto an outside surface of the structural pipe wall 12, and a fiber-reinforced resin layer 18 disposed onto a surface of the intermediate layer 16. The intermediate layer 16 is preferably formed from a material that is capable of attenuating an impact shock wave traveling through the pipe from the fiber-reinforced resin layer 18. In a first exemplary embodiment, materials capable of attenuating an impact shock wave include those that are chemically incompatible, with the resins that are used to form both the structural pipe wall and the fiber-reinforced resin layers. Such chemically incompatible materials include polyolefinic materials such as polypropylene, polyethylene and the like.

The use of such materials function to attenuate an impact shock wave through the pipe by not forming a bond, i.e., forming a release layer, with the surrounding structural pipe wall and fiber-reinforced resin layer. It has been discovered that the use of an intermediate layer 16 formed from such a release material is highly effective in minimizing, or even preventing, the transmission of shock waves through the intermediate layer, thereby protecting the structural pipe wall from possible damage or failure. A particularly preferred release material is polypropylene film in the form of tape.

FIG. 1 illustrates a first pipe embodiment comprising a single intermediate layer 16 that is covered by a single fiber-reinforced layer 18. The number of windings that are used to form the intermediate layer depends on many factors, such as the type of material that is used, the thickness of the material, and the particular pipe application. In an exemplary embodiment, the intermediate layer 16 is formed from windings of polypropylene tape. When the intermediate layer is polypropylene tape, it is applied to the structural pipe wall by the same winding technique described above for the structural pipe wall. Where the intermediate layer is formed from other than polypropylene or other material in tape form, it can be applied in sheet form, in spray form, or in the form of solid half sheets configured to fit over part of the structural pipe wall.

The intermediate layer 16 can alternatively be formed from a deformable or crushable impact absorbing material. Suitable deformable impact absorbing materials include rigid or flexible foams such as high density polyethylene foam and the like, sand, or other materials that are adapted to deform or otherwise give away to absorb an impact force. It is to be understood that some of the deformable impact absorbing materials, due to their chemical makeup, may also be chemically incompatible with the resins that are used to form both the structural pipe wall and the fiber-reinforced resin layer. The use of such shock absorbing materials function differently that the shock attenuating materials described above, to reduce or prevent an impact shock wave from reaching the structural wall, by absorbing the complete energy of the impact shock wave itself by compression of the material structure. An intermediate layer formed from the shock wave attenuating material does not absorb the shock wave, but rather minimizes or prevents its travel through the pipe by physically separating the bond between the structural wall and the fiber-reinforced resin layer, as the release material is substantially noncompressible.

Applications that are best suited for use of the fiber-reinforced resin pipe comprising an intermediate layer formed from the impact absorbing material include those where the outer pipe wall, i.e., the pipe wall formed from the fiber-reinforced resin layer, is sacrificial in nature so that the pipe can continue to function in the even that an impact fractures the outer pipe wall and comprises the impact absorbing material.

The fiber-reinforced resin layer 18 is wound around an outside surface of the intermediate layer 16. The materials, i.e., fiber and resin component, that are used to form the fiber-reinforced resin layer are the same as those previously described for forming the structural pipe wall, and can be the same or different than that selected to form the structural pipe wall. In a preferred embodiment, the fiber-reinforced resin layer is the same and is applied in the same manner as that selected to form the structural pipe wall. Like the intermediate layer 16, the number of windings that are used to form the fiber-reinforced resin layer 18 depends on the types of components used to form the fiber-reinforced resin system and the particular pipe application.

FIG. 2 illustrates a second exemplary embodiment of a fiber-reinforced pipe 20, constructed according to principles of this invention, having a structural pipe wall 22 formed in the same manner previously described above, comprising a filament windings 24 that are bonded together with resin. The pipe 20 includes an impact resistent jacket 21 comprising number of alternating intermediate layers 26 and 30, and fiber-reinforced resin layers 28 and 30. Although the pipe embodiment illustrated in FIG. 2 comprises two each alternating intermediate layers and fiber-reinforced resin layers, it is understood that such embodiment is provided for purposes of illustration and reference, and that the pipe may comprise any number of alternating layers.

The number of alternating intermediate and fiber-reinforced resin layers that are used to form the pipe depends on the degree of impact resistance that is desired for a particular pipe application. For example, it has been shown that using a single intermediate layer to form the pipe results in doubling the impact resistance of the pipe.

The material selected to form the intermediate layers 26 and 30 are selected from the same shock attenuating and shock absorbing materials described above, and each layer may be formed from the same or different material. For example, the pipe may be constructed having a first intermediate layer 26 formed from a shock attenuating material, and a second intermediate layer 30 formed from a shock absorbing material. As another example, the pipe may be constructed having first and second intermediate layers 26 and 30 formed from two progressively more shock absorbing materials. The ability to form a pipe that has intermediate layers formed from different types of materials allows a pipe designer the flexibility to design a pipe that is well suited for a particular pipe application.

Figure 3B:
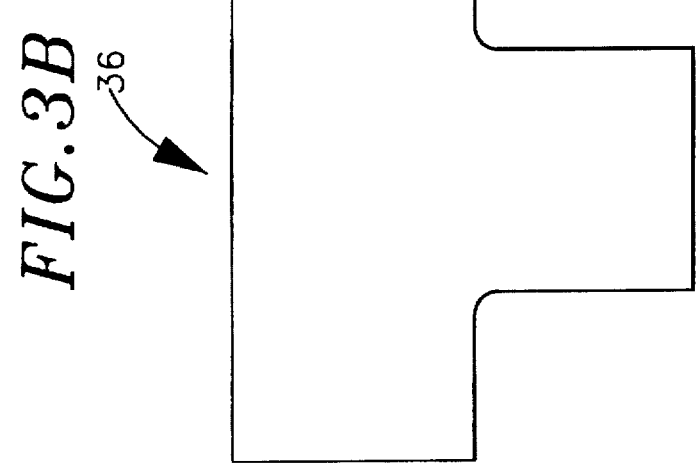
Figure 3C:
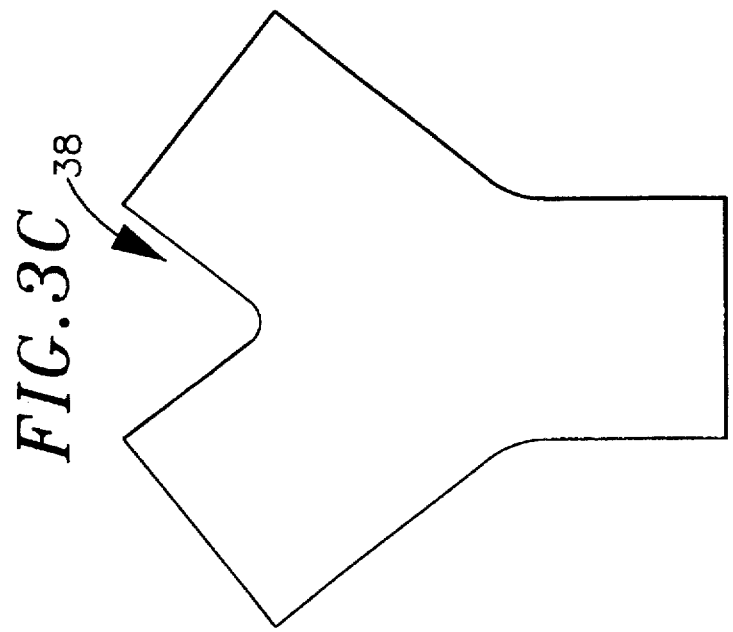

Although the construction of fiber-reinforced resin pipe embodiments have been specifically described and illustrated above, it is to be understood that this invention also includes the construction of fiber-reinforced resin pipe fittings. Referring to FIGS. 3A to 3C, fiber-reinforced resin pipe fittings, such as elbows 34, tees 36, Y-shaped fittings 38, and the like are also prepared according to principles of this invention.

A key feature of fiber-reinforced pipes constructed according to principles of this invention is the use of the intermediate layer to improve the impact resistance of the pipe. Impact tests conducted on pipes constructed according to principles of this invention have confirmed that improvements in impact resistance of at least 300 percent can be realized, as measured during ball drop impact testing, when compared to conventionally constructed fiber-reinforced pipe that do not include the intermediate layer.

The first embodiment of the pipe is formed by first helically winding reinforcing fiber wetted with the selected resin to form the structural pipe wall. The intermediate layer is disposed around the structural pipe wall. When the intermediate layer is formed from the polyolefinic film, it can be disposed around the structural pipe wall before the pipe wall is cured. The fiber reinforced resin layer is then disposed around the intermediate layer. When the intermediate layer is formed from the polyolefinic film, the structural pipe wall and fiber-reinforced resin layer can be cured simultaneously by conventional method. Accordingly, another key feature of the pipe construction is that it can be cured in a single step at the end of construction, rather than by multiple cure steps during different construction points.

Although specific embodiments and examples of fiber-reinforced resin pipe and pipe fittings have been described and illustrated, many modifications and variations will be apparent to those skilled in the art. It is, therefore, to be understood that, within the scope of the appended claims, fiber-reinforced resin pipe and pipe fittings of this invention can be constructed other than as specifically described herein.

What is claimed is:

1. A fiber-reinforced resin pipe comprising:
a structural pipe wall comprising layers of helically wound reinforcing fiber bonded with a resin selected from the group consisting of polyesters resin, vinyl ester resins, epoxy resins, and mixtures thereof; and
an intermediate layer disposed around a surface of the structural pipe wall; and
a fiber-reinforced resin layer disposed around a surface of the intermediate layer, wherein the intermediate layer is formed from a material that is chemically incompatible with the resins that are used to form the structural pipe wall and the fiber-reinforced resin layer.

2. The pipe as recited in claim 1 wherein the intermediate layer is formed from a substantially incompressible polyolefinic material.

3. The pipe as recited in claim 2 wherein the polyolefinic material is selected from the group consisting of polypropylene film and polyethylene film.

4. The pipe as recited in claim 1 wherein the intermediate is formed from a compressible material that is adapted to absorb an impact force.

5. The pipe as recited in claim 1 wherein the fiber-reinforced layer is comprising layers of helically wound reinforcing fiber bonded with a resin selected from the group consisting of polyesters resin, vinyl ester resins, epoxy resins, and mixtures thereof.

6. The pipe as recited in claim 1 wherein the fiber-reinforced resin layer is formed from the same materials that are used to form the structural wall.

7. The pipe as recited in claim 1 comprising a number of alternating intermediate layers and fiber-reinforced resin layers disposed around the structural pipe wall.

8. A fiber-reinforced resin pipe comprising:
a structural pipe wall comprising layers of helically wound reinforcing fiber bonded with a resin selected from the group consisting of polyesters resin, vinyl ester resins, epoxy resins, and mixtures thereof;
an intermediate layer disposed around the structural pipe wall; and
a fiber-reinforced resin layer disposed around a surface of the intermediate layer and forming an outside surface of the pipe, wherein the fiber-reinforced resin layer comprises layers of helically wound reinforcing fiber bonded with a resin selected from the group consisting of polyesters resin, vinyl ester resins, epoxy resins, and mixtures thereof, wherein the intermediate layer is formed from a substantially incompressible material that is incapable of forming a bond with the resins that are used to form the structural pipe wall and the fiber-reinforced resin layer.

9. The pipe as recited in claim 8 wherein the material used to form the intermediate layer is a polyolefinic film.

10. The pipe as recited in claim 8 wherein the fiber-reinforced resin layer is formed from the same materials as the structural wall.

11. A fiber-reinforced resin pipe comprising:
a structural pipe wall comprising layers of helically wound reinforcing fiber bonded with a resin selected from the group consisting of polyesters resin, vinyl ester resins, epoxy resins, and mixtures thereof;
a jacket disposed around the structural pipe, the jacket comprising alternating intermediate layers and fiber-reinforced resin layers, wherein a first intermediate layer is disposed around the structural wall and a last fiber-reinforced resin layer forms a pipe outside wall, wherein the fiber-reinforced layers comprise layers of helically wound reinforcing fiber bonded with a resin selected from the group consisting of polyesters resin, vinyl ester resins, epoxy resins, and mixtures thereof, and wherein the intermediate layers are formed from materials that are chemically incompatible with resins used to form the structural wall and fiber-reinforced layers.

12. The pipe as recited in claim 11 wherein the intermediate layers are formed from a polyolefinic material in substantially incompressible form.

13. The pipe as recited in claim 11 wherein the intermediate layers are formed from a compressible impact absorbing material.

* * * * *